(12) United States Patent
Addison et al.

(10) Patent No.: US 10,795,748 B2
(45) Date of Patent: *Oct. 6, 2020

(54) TAILORING DIAGNOSTIC INFORMATION IN A MULTITHREADED ENVIRONMENT

(71) Applicant: INTERNATIONAL BUSINESS MACHINES CORPORATION, Armonk, NY (US)

(72) Inventors: Edward A. Addison, Raleigh, NC (US); Darren R. Beard, Chandler's Ford (GB); William J. Bulfin, Hillsborough, NC (US); Peggy A. DeVal, Raleigh, NC (US); James A. Harrison, Warwick (GB); Manuela Mandelli, Hedge End (GB); John S. Tilling, Chandler's Ford (GB); Andrew Wright, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/202,425

(22) Filed: Nov. 28, 2018

(65) Prior Publication Data

US 2019/0095270 A1    Mar. 28, 2019

Related U.S. Application Data

(63) Continuation of application No. 15/213,470, filed on Jul. 19, 2016, now Pat. No. 10,169,130.

(51) Int. Cl.
*G06F 11/00* (2006.01)
*G06F 11/07* (2006.01)

(52) U.S. Cl.
CPC ........ *G06F 11/0775* (2013.01); *G06F 11/079* (2013.01); *G06F 11/0715* (2013.01); *G06F 11/0751* (2013.01); *G06F 11/0778* (2013.01)

(58) Field of Classification Search
CPC ................................................. G06F 11/0775
See application file for complete search history.

(56) References Cited

U.S. PATENT DOCUMENTS

| 6,792,559 B1 | 9/2004 | Cohen et al. |
| 7,401,261 B1 | 7/2008 | Whittaker et al. |

(Continued)

FOREIGN PATENT DOCUMENTS

| CN | 101630314 B | 12/2011 |
| CN | 106339401 A | 1/2017 |

OTHER PUBLICATIONS

Rogers et al., "z/OS Diagnostic Data Collection and Analysis," IBM, Redbooks, ibm.com/redbooks, International Technical Support Organization, Aug. 2005 (First Edition), Copyright International Business Machines Corporation 2005, pp. 1-250.

(Continued)

*Primary Examiner* — Jonathan D Gibson
(74) *Attorney, Agent, or Firm* — Alexis N. Hatzis

(57) ABSTRACT

Tailoring diagnostic information specific to current activity of multiple threads within a computer system. A request to dump system state is received. A system dump is created, including main memory and system state information. The system dump is stored to a database. In response to a request to format the system dump, the system dump is loaded from the database, whereby a virtual memory image of system state at system dump time is created. The virtual memory image and system state information is scanned to identify tasks that were running, tasks that have failed due to an error, and tasks that were suspended at system dump time. State information and control blocks associated with the identified tasks are collected from the system dump and collated based on task number. The database is updated with a formatted (Continued)

system dump, including the state information and control blocks associated with the identified tasks.

20 Claims, 6 Drawing Sheets

(56) References Cited

U.S. PATENT DOCUMENTS

| | | | | |
|---|---|---|---|---|
| 7,620,852 | B2* | 11/2009 | Rodeheffer | G06F 9/524 |
| | | | | 714/42 |
| 7,930,590 | B2* | 4/2011 | Cheng | G06F 11/3664 |
| | | | | 714/25 |
| 7,941,707 | B2* | 5/2011 | Sarig | G06F 11/0748 |
| | | | | 714/47.1 |
| 8,930,327 | B2* | 1/2015 | Hossain | G06F 16/289 |
| | | | | 707/692 |
| 8,990,159 | B2* | 3/2015 | Merriman | G06F 11/1471 |
| | | | | 707/638 |
| 9,009,537 | B2 | 4/2015 | Addison et al. | |
| 9,069,889 | B2 | 6/2015 | Addison et al. | |
| 9,176,804 | B2* | 11/2015 | Geisert | G06F 11/0778 |
| 9,251,339 | B2* | 2/2016 | Bullis | G06F 21/50 |
| 9,311,176 | B1* | 4/2016 | Khokhar | G06F 11/008 |
| 9,430,355 | B2* | 8/2016 | Braun | G06F 11/3476 |
| 9,430,415 | B2* | 8/2016 | Chamberlain | G06F 13/1626 |
| 10,169,130 | B2* | 1/2019 | Addison | G06F 11/0715 |
| 2004/0111707 | A1* | 6/2004 | Bliss | G06F 11/362 |
| | | | | 717/129 |
| 2005/0015579 | A1* | 1/2005 | Grover | G06F 11/0748 |
| | | | | 712/244 |
| 2005/0268053 | A1* | 12/2005 | Sexton | G06F 11/3636 |
| | | | | 711/159 |
| 2005/0283585 | A1* | 12/2005 | Sexton | G06F 11/366 |
| | | | | 711/171 |
| 2005/0289282 | A1* | 12/2005 | Ouriel | G06F 12/1036 |
| | | | | 711/1 |
| 2006/0143534 | A1* | 6/2006 | Dall | G06F 11/3636 |
| | | | | 714/38.11 |
| 2008/0215922 | A1* | 9/2008 | Cheng | G06F 11/366 |
| | | | | 714/39 |
| 2009/0024820 | A1* | 1/2009 | Ponnuswamy | G06F 11/0778 |
| | | | | 711/170 |
| 2009/0327815 | A1* | 12/2009 | Sridharan | G06F 11/0715 |
| | | | | 714/38.11 |
| 2011/0067007 | A1* | 3/2011 | Zamarreno | G06F 11/3476 |
| | | | | 717/128 |
| 2011/0276610 | A1* | 11/2011 | Hossain | G06F 16/289 |
| | | | | 707/813 |
| 2014/0040671 | A1* | 2/2014 | Akirav | G06F 11/1612 |
| | | | | 714/45 |
| 2014/0372712 | A1* | 12/2014 | Chamberlain | G06F 13/1626 |
| | | | | 711/151 |
| 2015/0347021 | A1* | 12/2015 | Foster | G06F 3/0607 |
| | | | | 714/37 |
| 2016/0267015 | A1* | 9/2016 | Li | G06F 12/10 |
| 2017/0109227 | A1* | 4/2017 | Furman | G06F 11/1415 |
| 2018/0024876 | A1* | 1/2018 | Addison | G06F 11/0715 |
| | | | | 714/45 |
| 2018/0373701 | A1 | 12/2018 | McAteer | |
| 2019/0095270 | A1* | 3/2019 | Addison | G06F 11/0715 |

OTHER PUBLICATIONS

Mell et al., "The NIST Definition of Cloud Computing", National Institute of Standards and Technology, Special Publication 800-145, Sep. 2011, pp. 1-7.
"Context Switch", Wikipedia, 2014.
"Virtual Memory", Wikipedia, 2015.
"Hyperlink", Wikipedia, 2014.
CAFC, Electric Power Group, LLC v. Alstom S.A., pp. 1-12, 2016.
U.S. Appl. No. 15/213,470, filed Jul. 19, 2016.
List of IBM Patents or Patent Applications Treated as Related (Appendix P), filed herewith.

* cited by examiner

TAILORING DIAGNOSTIC INFORMATION IN A MULTITHREADED ENVIRONMENT

BACKGROUND

The present invention relates generally to the field of error/fault detection in a data processing system, and more particularly to processing memory dumps in a multithreaded computing environment.

SUMMARY

Embodiments of the present invention disclose a computer-implemented method, computer program product, and system for tailoring diagnostic information specific to current activity of multiple threads within a computer system. A request to dump system state is received. A system dump is created, including main memory and system state information. The system dump is stored to a database. In response to a request to format the system dump, the system dump is loaded from the database, whereby a virtual memory image of system state when the system dump was made is created. The virtual memory image and system state information is scanned to identify tasks that were running, tasks that have failed due to an error, and tasks that were suspended when the system dump was made. State information and control blocks associated with the identified tasks are collected from the system dump and collated based on task number. The database is updated with a formatted system dump, including the state information and control blocks associated with the identified tasks.

DETAILED DESCRIPTION

Figure 1:
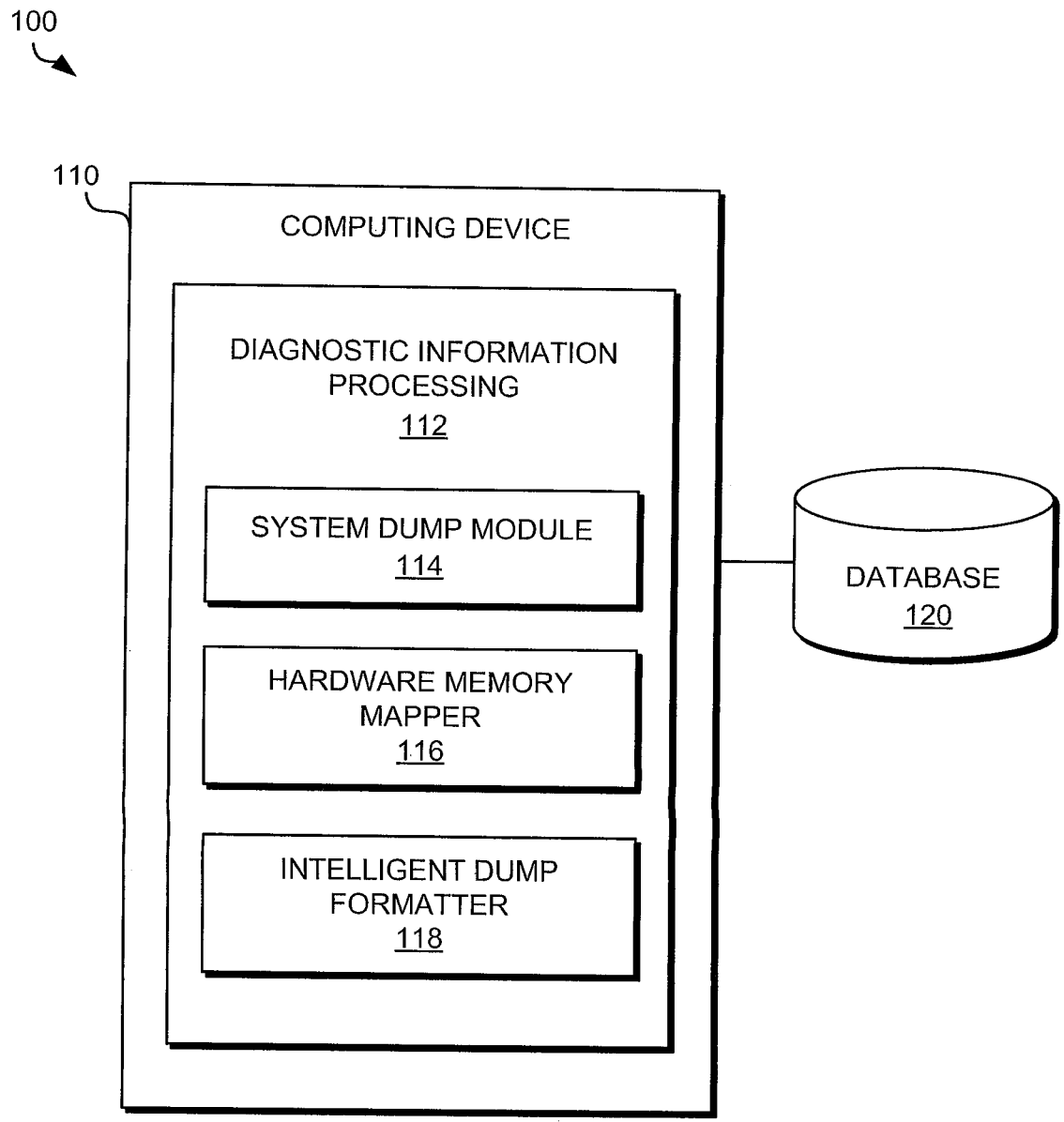
FIG. 1 depicts a functional block diagram of a diagnostic information processing system, in accordance with an embodiment of the present invention.

In computing, a system dump (also called memory dump or core dump) refers to a record of the state of the working memory, or virtual storage, of a computer program at a specific instant in time, typically when the program has crashed or failed due to an error (i.e., abended). On many operating systems, a fatal error in a program may automatically trigger a system dump. A system dump may also be requested by a program. In addition to main memory, other key pieces of program state are typically also recorded, or dumped, including the processors' hardware registers, which may include the program counter and stack pointer, status registers, memory management information, and other processor and operating system flags and information. System dumps are often used to assist service programmers in diagnosing problems in computer systems and debugging errors in computer programs. System dumps are typically large hexadecimal files, which may be converted into a more readable form by a dump formatting program.

Virtual storage (also called virtual memory) is a computer memory management technique that is implemented using both hardware and software. With virtual storage, memory addresses used by a program, called virtual addresses, are mapped to physical addresses in memory. Main storage as seen by a process or task appears as a contiguous address space or collection of contiguous segments. The operating system manages virtual address spaces and the assignment of real memory to virtual storage. Address translation hardware in the CPU automatically translates virtual addresses to physical addresses. Operating system software may extend these capabilities to provide a virtual address space that can exceed the capacity of real memory, and thus reference more memory than is physically present in the computer. Typically, each process runs in its own dedicated address space. Thus, each program appears to have sole access to the virtual storage.

Multithreading refers to a computer architecture that enables a central processing unit (CPU) or a single core in a multi-core processor to execute multiple processes or threads concurrently, supported by the operating system. Processes and threads are both independent sequences of execution. However, threads of the same process typically run in a shared memory space, while processes run in separate memory spaces. In contrast to multiprocessing, with multithreading the processes and threads share the resources of a single core or multiple cores, for example, the computing units, the CPU caches, and the translation lookaside buffer (TLB).

Transaction processing refers to information processing that is divided into individual, indivisible operations called transactions. Each transaction must succeed or fail as a complete unit; it can never be only partially complete. Transactions ensure that data-oriented resources are not permanently updated unless all operations within the transactional unit complete successfully. Combining a set of related operations into a unit that either completely succeeds or completely fails simplifies error recovery and makes applications more reliable.

A transaction server manages the operations of software-based transactions, or transaction processing. For example, it manages application and database transactions on a network or the internet, within a distributed computing environment. A transaction server provides services that extend or replace certain functions of the operating system, and are both more efficient than the generalized services in the operating system and simpler for programmers to use, particularly with respect to communication with various terminal devices.

A typical transaction processing environment is organized into domains. With the exception of the application domain (AP), which contains several components, each domain is generally a single major component of the system. In addition to AP, examples of domains in a transaction processing environment include kernel (KE), sockets (SO), and user (US). Communication between domains is generally managed by kernel routines, but each domain typically manages its own data. In particular, each domain typically has a specific set of control blocks and state information associated with it.

Problem determination in a multithreaded transaction processing environment often requires analysis of a system dump. A transaction processing environment may contain many threads of execution within a region at the same time. A thread may be at the task control block (TCB) level or one of many tasks created and sub-dispatched under a TCB by the transaction processing system. Typically, the majority of these tasks will be performing work in one or more components of a program and will be either suspended (e.g., waiting on a resource) or active (i.e., running) under their associated TCB.

The information provided by a system dump tends to relate to a set of resources, for example, all files and file activity, all sockets and socket activity, etc. This may be of assistance when performing top-down problem determination, but it is often the case that for problem diagnosis it is necessary to review activity relating to a particular task or set of tasks. However, in a busy production transaction processing environment there may be thousands of separate tasks in the system. This makes problem determination challenging when having to review a memory dump and identify the resources and activities of interest.

In current transaction processing systems, the diagnostic data provided for tasks in the system typically shows the series of modules that were called leading up to the point in time when a system dump was performed. As such, it reveals the component and resources that the task was using at the time of the dump; however, it may not provide further information specific to the component or resources that the task may have been using. A service programmer is required to look elsewhere within the diagnostic data in order to construct a full picture of the status of each task. As stated above, this is a challenge when dealing with a very busy system.

A system that allows service programmers quickly to identify resources of interest in a system dump for tasks that were active or suspended within the system, and allows them to review pertinent state information and associated data, would expedite problem determination. This would be advantageous in that it would reduce the time required to resolve system outages or abends and so reduce service costs and improve customer satisfaction.

Embodiments of the present invention disclose a computer-implemented method, computer program product, and system for tailoring diagnostic data in a multithreaded computer environment.

The present invention is directed to providing targeted diagnostic data, based on the work being handled at dump time by each separate and discrete thread of execution within the system being dumped. Having this data analyzed, collected, organized, and presented would greatly assist in expediting problem determination.

Embodiments of the present invention describe the provision of resource-related diagnostic data associated with the component within the system in which each task was performing work when a system dump was requested. For example, one task may have been suspended, waiting for file I/O activity to complete. A second task may have been performing a database table access operation. A third task could be completing an SSL handshake. In various embodiments of the invention, resource and/or or suspend types associated with tasks are determined and only relevant diagnostic data, associated with the particular set of resources or component identified, may be provided.

In an embodiment of invention, tasks represented in a system dump of a transaction management system are scanned and information associated with the tasks is extracted. The information need not reside in a single domain of the system, for example, dispatcher, kernel, etc., but may be gathered from wherever it resides, and may be included in a summary information. Depending on the status of a given task, specific relevant information may be extracted from the dump, collated based, for example, on task number, task status, component, domain, etc., and presented in a format suitable for problem determination.

For example, tasks that are suspended are typically waiting for a particular resource to become available, or for a specific time to occur, or for an event to happen. Information associated with a suspended task may include control blocks and state information related to the resources on which the task is waiting. Various examples of state information and control blocks that may be considered relevant, based on the resources a suspended or abended task may have been using or waiting on at dump time, are described in greater detail in reference to FIG. 3, below.

As an illustrative example, suppose that in a typical transaction processing system task 00063 has abended for some reason in the application manager (AP) domain. The kernel domain (KE) section of the system dump, with the call stack, might include a list of modules as shown in Table 1, below. In Table 1, KE_NUM refers to the kernel domain task number, @STACK is the pointer to working storage of the program, LEN is the length of the working storage of the program, TYPE is the type of link operation to that level in the stack, ADDRESS is the address in virtual storage in the address space of the stack entry, LINK REG is the address in virtual storage in the address space where the branch has been issued from to go from one stack program to another, OFFSET is the offset within the linking program in virtual storage in the address space, ERR indicates a potential error condition, and NAME is the name of the program which has issued the linking request within the program stack.

TABLE 1

EXAMPLE SYSTEM DUMP: CALL STACK

| KE_NUM | @STACK | LEN | TYPE | ADDRESS | LINK REG | OFFSET | ERR | NAME |
|---|---|---|---|---|---|---|---|---|
| 021A | 2B57C040 | 01F0 | Bot | 29103700 | A9103CBE | 0005BE | | DFHKETA |
| 021A | 2B57C230 | 03E0 | Dom | 2911EA58 | A911ED1C | 0002C4 | | DFHDSKE |
| 021A | 2B57C610 | 13C0 | Dom | 29156E20 | A915853E | 00171E | | DFHXMTA |
| 021A | 2B57D9D0 | 13F0 | Dom | 298245B0 | A9827590 | 002FE0 | | DFHPGPG |
| | | | Int | +000494 | A9824844 | 294 | | INITIAL_LINK |
| 021A | 2B57EDC0 | 0E60 | Dom | 29D14D00 | A9D0F6AA | 0 | | DFHAPLI1 |
| | | | Int | +002CAC | A9D15B0A | 000E0A | | CICS_INTERFACE |
| 021A | 2B57FC20 | 11B8 | Lifo | 29D0F500 | A9D10D66 | 1866 | | DFHEPC |
| 021A | 2B580DD8 | 16E0 | Dom | 2980F800 | A981264C | 002E4C | | DFHPGLE |
| | | | Int | +000652 | A980FA2A | 00022A | | LINK_EXEC |

TABLE 1-continued

EXAMPLE SYSTEM DUMP: CALL STACK

| KE_NUM | @STACK  | LEN  | TYPE | ADDRESS  | LINK REG | OFFSET | ERR | NAME          |
|--------|---------|------|------|----------|----------|--------|-----|---------------|
| 021A   | 2B523040| 0E60 | Dom  | 29D14D00 | A9D0FC1E | 0      |     | DFHAPLI1      |
|        |         |      | Int  | +002CAC  | A9D15B0A | 000E0A |     | CICS_INTERFACE|
| 021A   | 2B523EA0| 06B0 | Dom  | 2957E948 | A95816A2 | 002D5A |     | DFHABAB       |
|        |         |      | Int  | +00288A  | A9580904 | 001FBC |     | DUMP_ROUTINE  |
| 021A   | 2B524550| 0720 | Dom  | 29267530 | A92689B6 | 1486   |     | DFHDUDU       |

Typically, problem diagnosis requires accessing the AP domain section of the dump and examining the AP domain control blocks and other state information, which are presented in that section. Table 2, below, shows an example portion of a control block for a task 00063. Different control blocks generally control different information and are of different lengths. In an embodiment of the invention, the AP domain control blocks and status information for a task would automatically be located and collected for presentation.

TABLE 2

EXAMPLE SYSTEM DUMP: AP CONTROL BLOCK

```
TCA.00063 00049080 Task Control Area (User Area)
0000 00049180 00000001 2B626570 00041048 00000000 2B4D6550 00000000 00000000 *..j................(.&........* 00049080
0020 00000060 0000063C 00000000 00000000 2B88A780 0000027A 009A6000 00100048 *...-...........hx....:..-.....* 00490A0
0040 AC28969A 00086EA4 00000000 29D1B870 00000000 00000000 60000097 01004100 *..o...>u.....J.........-..p....* 00490C0
0060 00000000 C1D4D7C2 00000000 00000000 00000000 00000000 00000000 2B626570 *....AMPB.......................* 00490E0
0080 00000000 00000000 00000000 00000000 00000000 00000000 00000000 00000000 *...............................* 0049100
00A0 00000000 8008466A 00000000 2B7191F4 00000000 00041048 00000000 00000000 *..............j4...............* 0049120
00C0 00000000 60000000 C1D4D7C2 00000000 00000000 00000000 00000000 2B718FF0 *....-...AMPB..................0* 0049140
00E0 00000000 00000000 00041800 009A3000 00000000 00000000 00002000 00000000 *...............................* 0049160
```

Suppose that, moreover, the KE section of the dump shows that tasks 021C and 001C are suspended, i.e., not running, as illustrated in Table 3:

TABLE 3

EXAMPLE SYSTEM DUMP: KE TASK SUMMARY

| KE_NUM | KE_TASK  | STATUS      | TCA_ADDR | TRAN_# | TRANSID | DS_TASK  | KE_KTCB  | ERROR    |
|--------|----------|-------------|----------|--------|---------|----------|----------|----------|
| ...    |          |             |          |        |         |          |          |          |
| 001C   | 2A87F800 | Not Running | 2938B700 | TCP    | CSTP    | 3BF78B00 | 2917B200 |          |
| ...    |          |             |          |        |         |          |          |          |
| 021C   | 2B63C800 | Not Running | 29590800 | 00024  | CSNC    | 29336200 | 29465C80 |          |

In Table 3, KE_NUM is the kernel task number, KE_TASK is the address in virtual storage in the address space of the kernel task control block, STATUS is the execution status of the task, TCA_ADDR is the address in virtual storage in the address space of the task control area control block, TRAN_# is task number or alphanumeric string assigned to specific tasks, TRANSID is a transaction identifier string of the task, DS_TASK is the address in virtual storage in the address space of the dispatcher task control block, KE_KTCB is the address in virtual storage in the address space of the kernel TCB control block which maps the state to that of an associated system TCB, and ERROR indicates a potential error condition.

To determine why task 021C is suspended, one would typically identify which resource task 021C is waiting on, and then find and inspect the appropriate sections of the dump. In an embodiment of the invention, the resource causing task 021C to suspend would be checked and the associated control blocks would be collected for presentation. For example, in Table 3, the fact that the transaction for task 001C is given as TCP indicates that TCP control blocks are relevant for task 001C.

For each task represented in the dump, the abend code or suspend resource may be checked to determine which sections of the dump are likely to be relevant for the task in question. Instead of a service programmer needing to collect and format different sections of the dump for investigating different tasks in the system, in an embodiment of the invention, an intelligent dump formatter determines which state information and control blocks are relevant, based on the domains or components of the task and any associated resources, and formats them for use in problem determination. The control blocks could originate in multiple domains, or potentially from other address spaces also included in the dump. For example, if a web service request is suspended, then the intelligent dump formatter may select and format PI (pipeline manager, which manages SOAP, simple object access protocol, messages between web applications), SO (sockets domain, which provides TCP/IP services) and AP (application manager) domain control blocks for the task.

In an embodiment of the invention, when intelligent dump formatting takes place, the data in a dump file is extracted into the memory (i.e., address space) of the job running the dump formatter logic. This memory then has a mapping of the virtual storage as was present in the original address space's memory of the region that generated the dump. This data is then collected and collated from the dump formatting processes own memory (i.e., address space). As mentioned above, this represents a hardware memory mapping of the data from one address space's set of memory data into another set of virtual memory data within another job's address space.

FIG. 1 is a functional block diagram of a diagnostic information processing system 100, in accordance with an embodiment of the present invention. Diagnostic information processing system 100 includes computing device 110. Computing device 110 represents the computing environment or platform that hosts diagnostic information processing program 112. In various embodiments, computing device 110 may be a laptop computer, netbook computer, personal computer (PC), a desktop computer, or any programmable electronic device capable of hosting diagnostic information processing program 112, in accordance with embodiments of the invention. Computing device 110 may include internal and external hardware components, as depicted and described in further detail below with reference to FIG. 4. In other embodiments, computing device 110 may be implemented in a cloud computing environment, as described in relation to FIGS. 5 and 6, below.

In an exemplary embodiment of the invention, computing device 110 includes diagnostic information processing program 112 and database 120.

Figure 4:
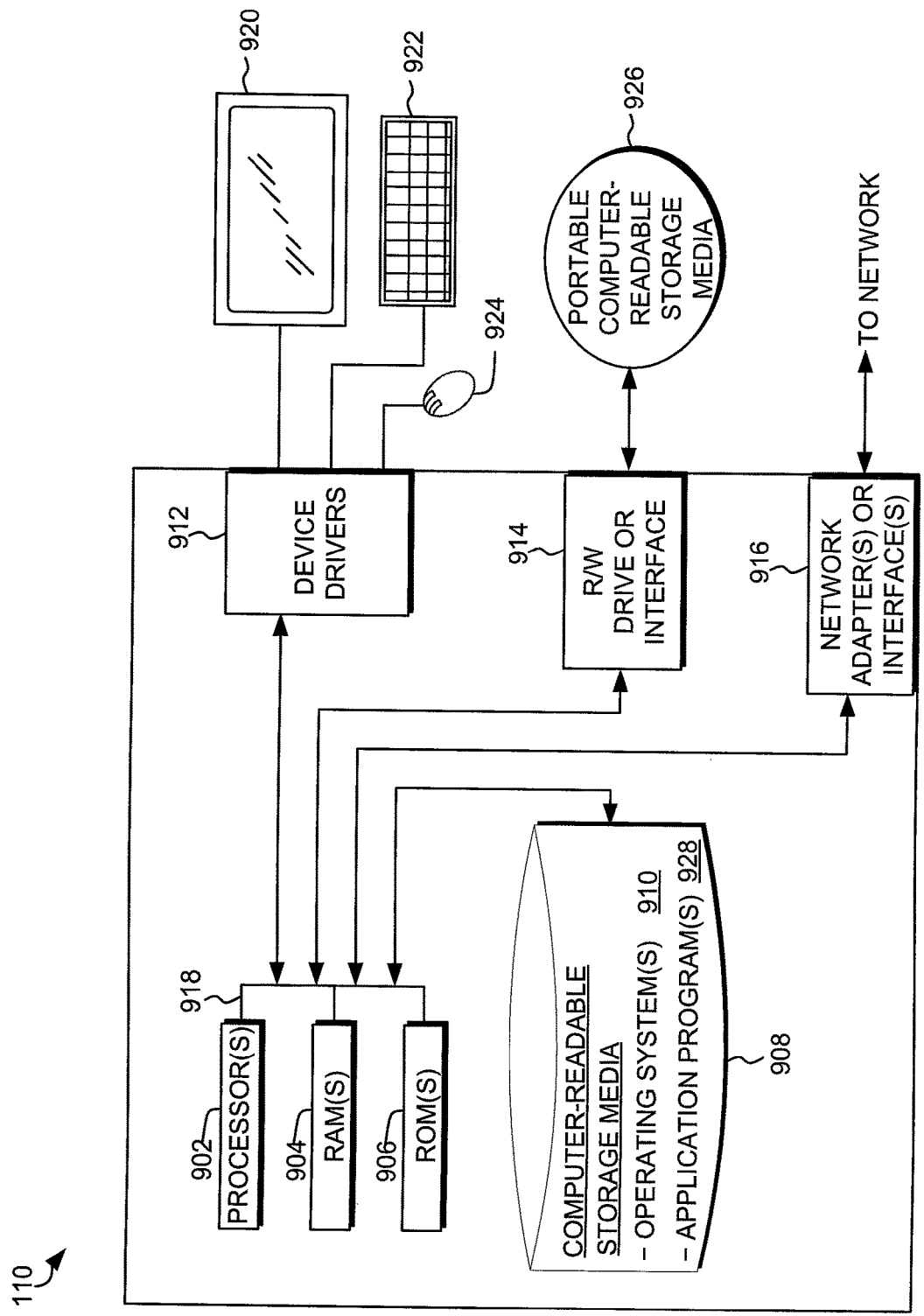
FIG. 4 is a functional block diagram illustrating a data processing environment, in accordance with an embodiment of the present invention.
Figure 5:
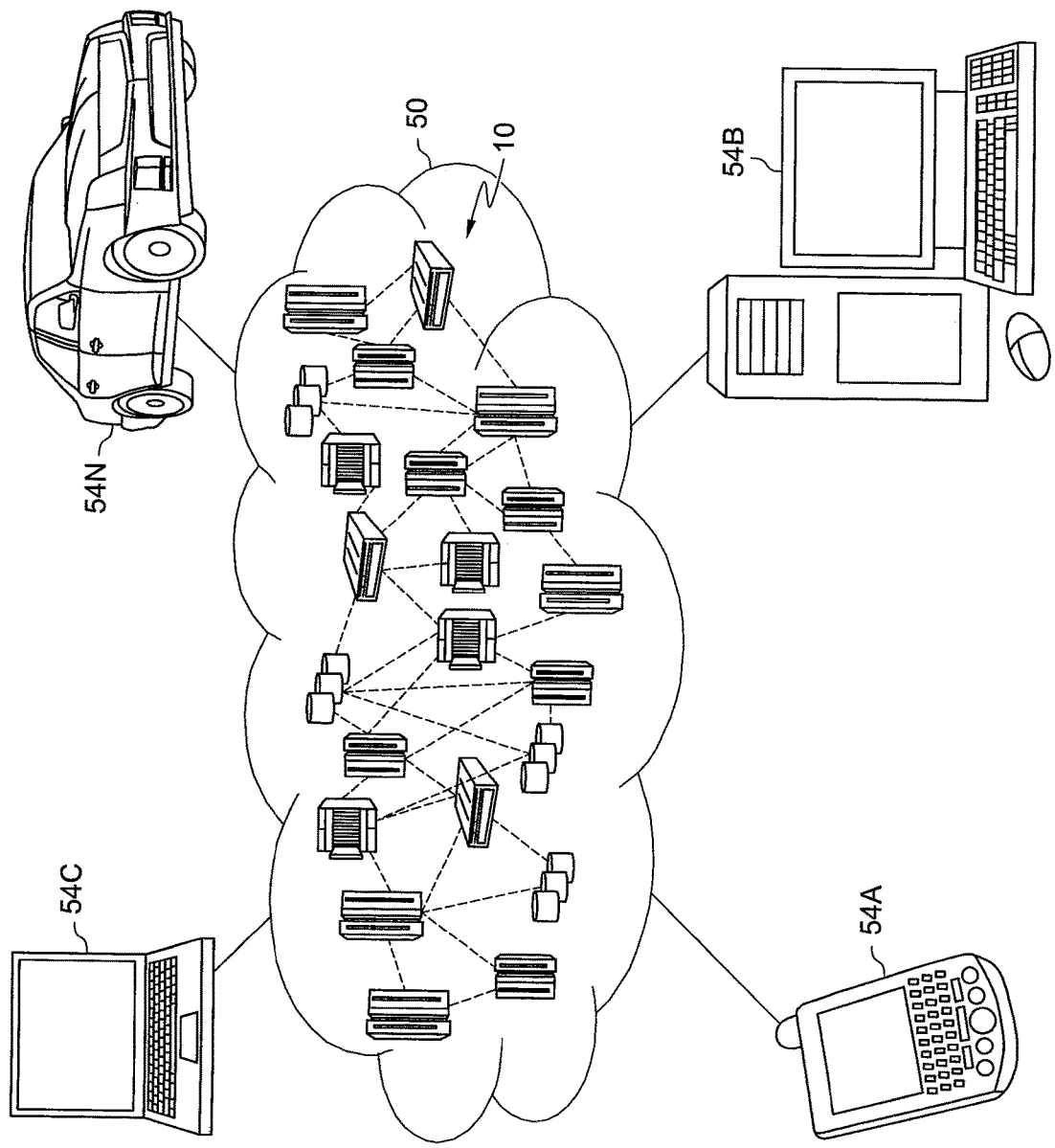
FIG. 5 depicts a cloud computing environment, in accordance with an embodiment of the present invention.

Database 120 represents a store of data that diagnostic information processing program 112 may have access to. For example, database 120 may store system dumps generated by computing device 110. Database 120 may also store formatted dumps generated by intelligent dump formatter 118. Database 120 may reside, for example, on computer readable storage media 908 (FIG. 4). Database 120 may reside in virtual storage 72 (FIG. 6) in a cloud computing environment 50 (FIG. 5). Database 120 may reside on a dump device, for example a tape drive or hard drive, which is reserved for storing system dumps.

Diagnostic information processing program 112, in an embodiment of the invention, operates generally to generate and store a system dump, and to extract, organize, and present diagnostic information associated with the system component in which the task was working and the resources associated with the task. Diagnostic information processing program 112 may include system dump module 114, hardware memory mapper 116, and intelligent dump formatter 118.

System dump module 114 operates generally, upon receiving a request to generate a system dump, to store a record of the state of virtual storage for a computer program, or job, at the time the system dump was created. System dump module 114 may store an image of virtual memory for the job, as well as other key pieces of program state, or system status, such as the contents of processors' hardware registers, which may include the program counter and stack pointer, status registers, memory management information, and other processor and operating system flags and information. System dump module 114 may also dump information on devices in the system and their associated data structures. System dump module 114 may store this data, for example, on database 120.

Hardware memory mapper 116 operates generally to retrieve a system dump from database 120 and create a virtual memory image of the system at the time the dump was created, in accordance with an embodiment of the present invention. Hardware memory mapper 116 may extract the data in a system dump into the address space of the diagnostic information processing program 112 job. This memory then has a mapping of the virtual storage as was present in the original address space's memory of the region that generated the dump. Since diagnostic information processing program 112 runs as a job on computing device 110, it has an address space of memory locations. However, it operates on a system dump of other address spaces, in which the job which instigated the dump was running. As the addresses in both the diagnostic information processing program 112 job's address space and the failing job's address space are similar, hardware memory mapper 116 may disambiguate addresses of memory locations associated with the two address spaces, for use by intelligent dump formatter 118.

In an embodiment of the present invention, intelligent dump formatter 118 operates to scan the virtual memory image created by hardware memory mapper 116, and associated system state information, determine which tasks were running at dump time, which, if any, had abended, and which were suspended, for example waiting on one or more resources, and collect, organize, and present diagnostic information, including relevant control blocks, for use in problem diagnosis. Intelligent dump formatter 118 may determine which state information and control blocks are relevant, based on the state information and control blocks associated with the component and/or resources associated with each task present in the virtual memory image, and based on what may have caused the task in question to suspend or abend. Intelligent dump formatter 118 then collates and formats the relevant diagnostic information for use in problem determination. Intelligent dump formatter 118 may update database 120 with the formatted dump information.

Figure 2:
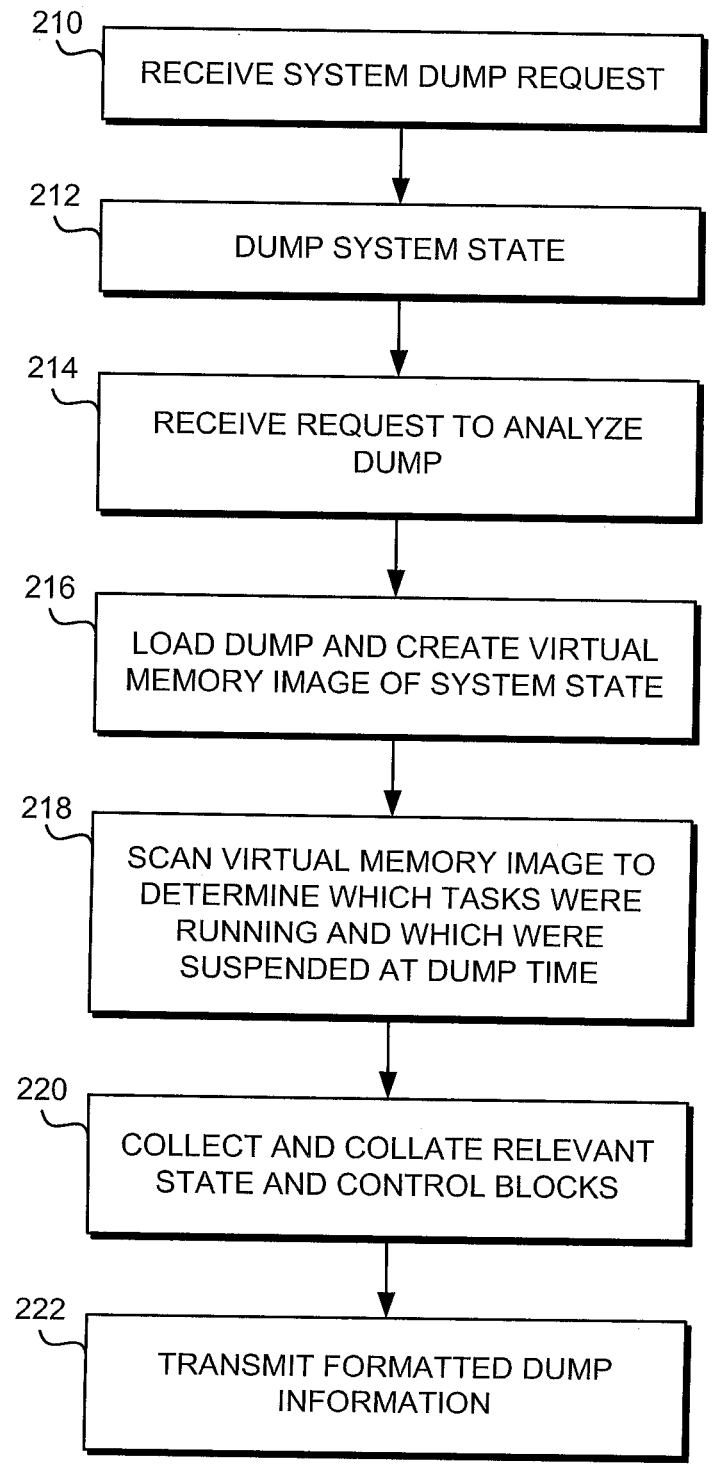
FIG. 2 is a flowchart depicting operational steps of a diagnostic information processing program, in accordance with an embodiment of the present invention.

FIG. 2 is a flowchart depicting various operational steps performed by diagnostic information processing program 112, operating on computing device 110 within diagnostic information processing system 100 (FIG. 1), in accordance with an embodiment of the present invention. Diagnostic information processing program 112 receives a request to generate a dump (step 210). System dump module 114 dumps system state to database 120, including a record of virtual storage and other key pieces of program state (step 212). Upon receiving a request to analyze the dump (step 214), hardware memory mapper 116 loads the dump into memory, creating a virtual memory image of the system at the time the dump was created (step 216). Intelligent dump formatter 118 scans the virtual memory image to identify those tasks that were running, had abended, or were suspended at dump time (step 218). Intelligent dump formatter 118 then collects and collates state information and control blocks associated with these tasks (step 220) and transmits the formatted dump information for storage, e.g., on database 220, and/or analysis in problem diagnosis (step 222).

In an embodiment of the invention, the formatted dump information may be presented to a service programmer to aid in diagnosing problems in the computer system or to debug errors in a computer program. For this purpose, the formatted dump information may be displayed in a graphical user interface (GUI). For example, a GUI may present the formatted dump data in such a way that for each task identified in the virtual memory image, hyperlinks may be used to access the state information and control blocks collected and collated for the task.

In an embodiment of the invention, various options may be available to configure and refine how intelligent dump formatter 118 operates in collecting and collating system dump data. For example, one formatting option may filter out certain preselected types of state information and/or control blocks from the formatted dump, for selected domains. Another formatting option may specify that, along with the state information and control blocks collected for a given task, certain state information and/or control blocks associated with other tasks in the same domain or component should be included. Another option may specify that when an identified task was waiting on or associated with a resource, state information and/or control blocks associated with other tasks waiting on or associated with the resource should also be included. These formatting options may be configured, for example, by a system administrator as standard site options, or may be configured by a user to be used one time or as defaults.

In another embodiment of the invention, diagnostic information processing program 112 may learn from previous uses of intelligent dump formatting in order to return enhanced diagnostic data in future dump analyses. For example, diagnostic information processing program 112 may record which formatting options have been selected most often by a user and base its default actions on these options.

Figure 3:
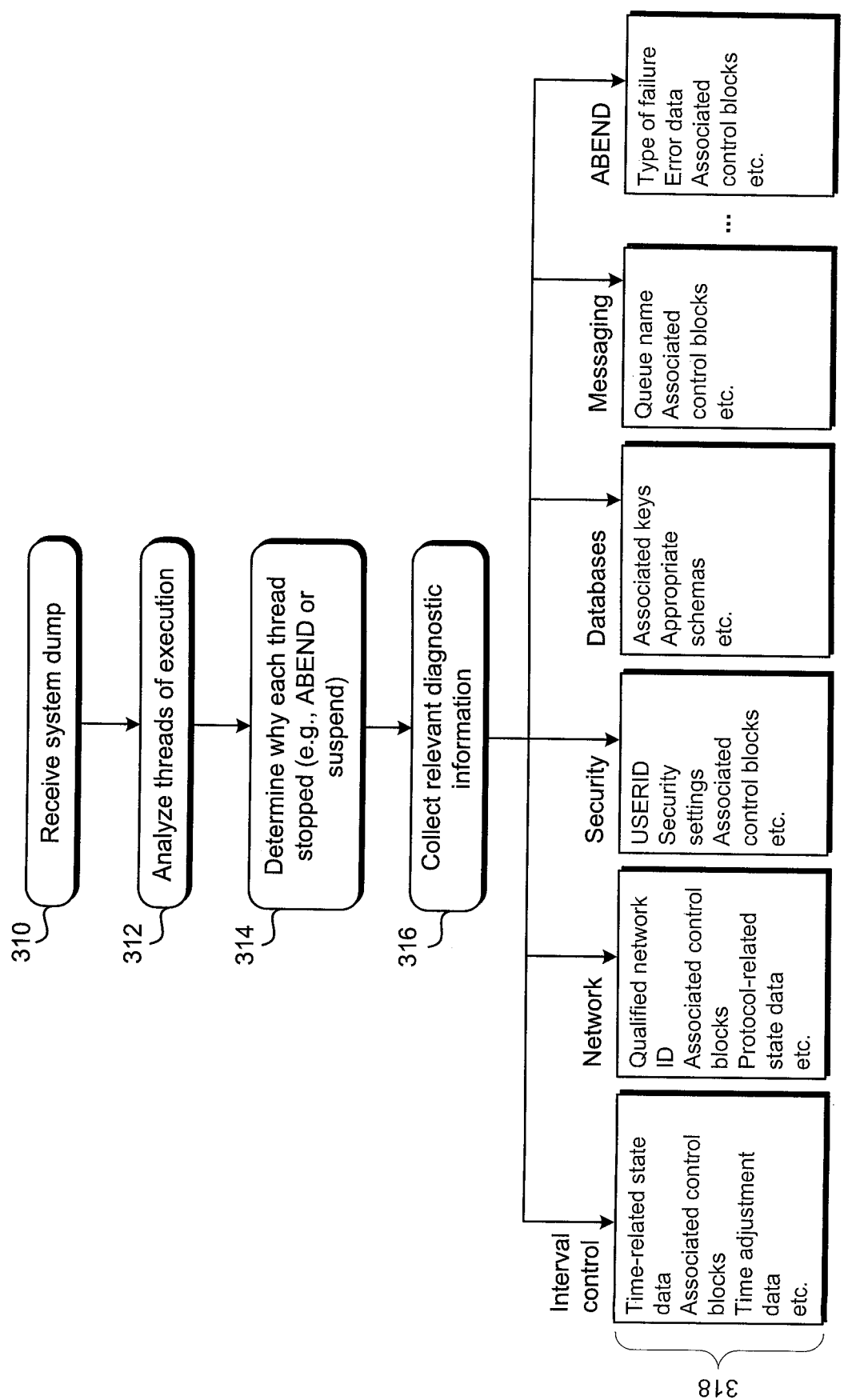
FIG. 3 presents a schematic diagram of intelligent dump formatting, in accordance with an embodiment of the present invention.

FIG. 3 depicts a schematic diagram of the workflow of intelligent dump formatter 118, in accordance with an embodiment of the present invention. Intelligent dump formatter 118 receives from hardware memory mapper 116 the virtual memory image corresponding to the system state at the time the dump was generated, as well as other system state data at dump time (step 310). Intelligent dump formatter 118 identifies the threads of execution present in the virtual memory image (step 312), determines what caused the task in question to suspend or abend (step 314), and collects relevant diagnostic information for problem analysis, based on the state information and control blocks associated with the component and/or resources associated with each task (step 316). Example diagnostic information 318 relevant to tasks associated with various components, such as interval control, network, security, databases, messaging, abend, etc. are listed. FIG. 3 does not present an exhaustive list and is for illustrative purposes only. For example, interval control refers to services that provide functions related to time, including enabling the starting of user and system transactions at user-specified times. In addition to control blocks associated with interval control, other relevant diagnostic information may include time-related state data and time adjustment data.

FIG. 4 depicts a block diagram showing functional components of a computing device 110, in accordance with an embodiment of the present invention. It should be appreciated that FIG. 4 provides only an illustration of one implementation and does not imply any limitations with regard to the environments in which different embodiments may be implemented. Many modifications to the depicted computing environment may be made.

Referring to FIG. 4, computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, diagnostic information processing program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user s. The device drivers 912, R/W drive or interface 914 and network adapter or interface 916 may comprise hardware and software (stored on computer readable storage media 908 and/or ROM 906).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
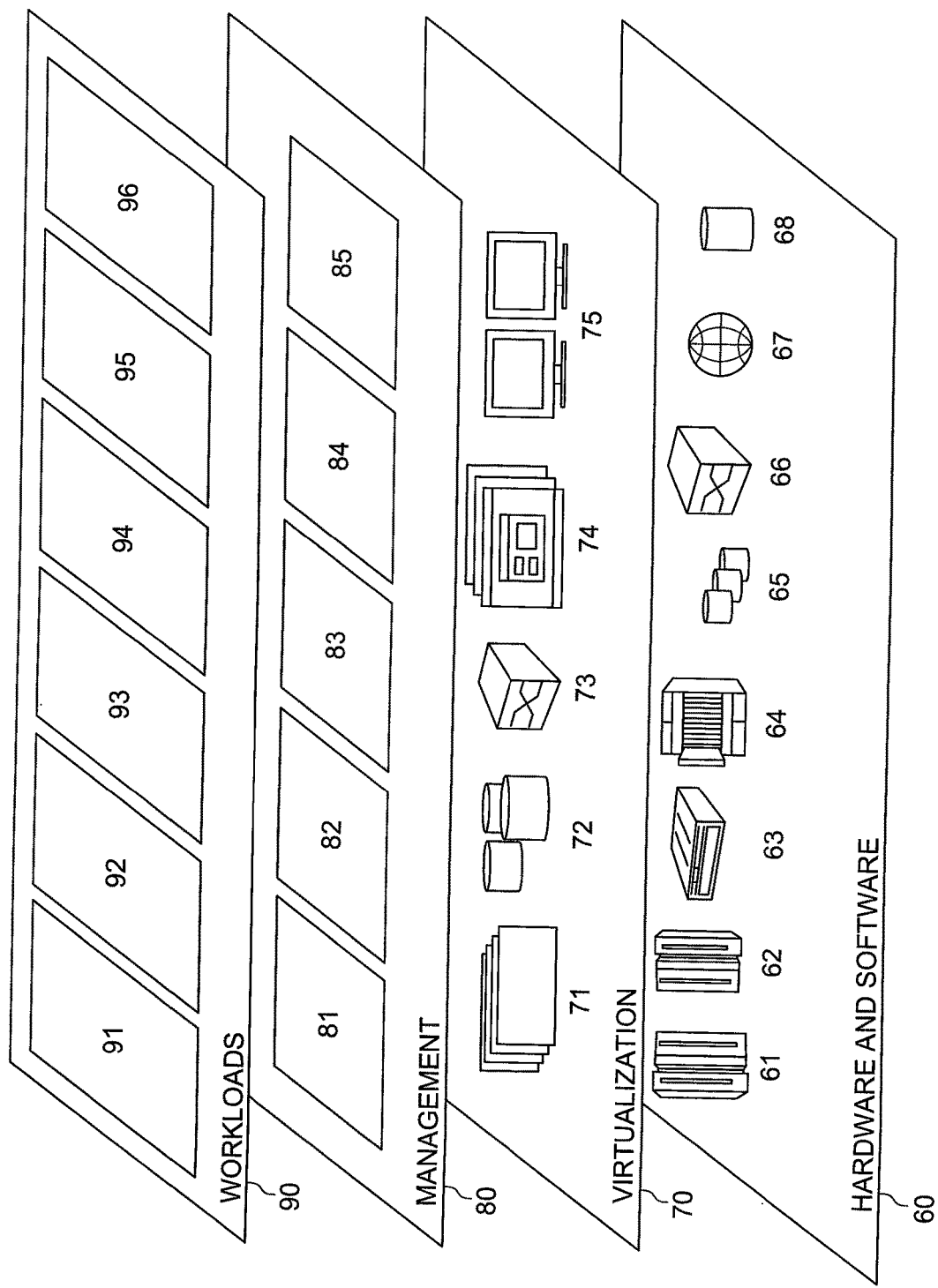
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and diagnostic information processing 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for tailoring diagnostic information specific to current activity of multiple threads within a computer system, the method comprising:
    creating, by one or more processors, a system dump, including main memory and system state information, the system dump being a first hardware memory mapping;
    storing, by one or more processors, the system dump to a database;
    executing, by one or more processors, a program to provide tailored diagnostic information; and
    creating, by one or more processors, a virtual memory image of a system state, based on the memory dump, in the address space of the program, by creating a second hardware memory mapping of the hardware memory addresses of the address space of the program to the virtual memory addresses of the virtual memory image of the system state.

2. The method of claim 1, further comprising:
    scanning, by one or more processors, the virtual memory image and system state information, using the second hardware memory mapping, to identify tasks that were running, tasks that have failed due to an error, and tasks that were suspended when the system dump was made;
    collecting and collating based on task number, by one or more processors, from the system dump, using the second hardware memory mapping, state information and control blocks associated with the identified tasks; and
    storing, by one or more processors, to the database, a formatted system dump, including the collected and collated state information and control blocks for the identified tasks.

3. The method of claim 1, further comprising:
    displaying, by one or more processors, via a graphical user interface (GUI), the identified tasks; and
    displaying, by one or more processors, via the GUI, for each identified task, the state information and control blocks collected and collated for the task, whereby the state information and control blocks are associated with the task via hyperlinks.

4. The method of claim 1, wherein state information and control blocks associated with the identified tasks are based on:
    for each identified task that has failed due to an error, a component in which the task was running, resources associated with the task, a type of failure, and associated error information;
    for each identified task that was running, a component in which the task was running and resources associated with the task; and
    for each identified task that was suspended, a component in which the task was running and resources on which the task was waiting.

5. The method of claim 4, further comprising:
    for an identified task that has failed due to an error, collecting and collating, from the system dump, state information and control blocks for other identified tasks in a same component in which the identified task was running when it failed, and/or to which resources were associated that were associated with the identified task.

6. The method of claim 4, further comprising:
    for an identified task that was running, collecting and collating, from the system dump, state information and control blocks for other identified tasks in a same component in which the identified task was running, and/or to which resources were associated that were associated with the identified task.

7. The method of claim 4, further comprising:
    for an identified task that was suspended, collecting and collating, from the system dump, state information and control blocks for other identified tasks in a same component in which the identified task was running, and/or which were waiting on resources on which the identified task was waiting.

8. A computer system for tailoring diagnostic information specific to current activity of multiple threads within a computer system, comprising:
    one or more computer processors, one or more computer-readable storage media, and program instructions stored on one or more of the computer-readable storage media which, when executed by at least one of the one or more processors, cause the at least one of the one or more processors to perform a method comprising:
    creating a system dump, including main memory and system state information;
    storing the system dump to a database;
    executing, by one or more processors, a program to provide tailored diagnostic information; and
    creating, by one or more processors, a virtual memory image of a system state, based on the memory dump, in the address space of the program, by creating a second hardware memory mapping of the hardware memory addresses of the address space of the program to the virtual memory addresses of the virtual memory image of the system state.

9. The computer system of claim 8, further comprising:
    scanning the virtual memory image and system state information, using the second hardware memory mapping, to identify tasks that were running, tasks that have failed due to an error, and tasks that were suspended when the system dump was made;
    collecting and collating based on task number, from the system dump, using the second hardware memory mapping, state information and control blocks associated with the identified tasks; and
    storing, to the database, a formatted system dump, including the collected and collated state information and control blocks for the identified tasks.

10. The computer system of claim 8, further comprising:
displaying, via a graphical user interface (GUI), the identified tasks; and
displaying, via the GUI, for each identified task, the state information and control blocks collected and collated for the task, whereby the state information and control blocks are associated with the task via hyperlinks.

11. The computer system of claim 8, wherein state information and control blocks associated with the identified tasks are based on:
for each identified task that has failed due to an error, a component in which the task was running, resources associated with the task, a type of failure, and associated error information;
for each identified task that was running, a component in which the task was running and resources associated with the task; and
for each identified task that was suspended, a component in which the task was running and resources on which the task was waiting.

12. The computer system of claim 11, further comprising:
for an identified task that has failed due to an error, collecting and collating state information and control blocks for other identified tasks in a same component in which the identified task was running when it failed, and/or to which resources were associated that were associated with the identified task.

13. The computer system of claim 11, further comprising:
for an identified task that was running, collecting and collating, from the system dump, state information and control blocks for other identified tasks in a same component in which the identified task was running, and/or to which resources were associated that were associated with the identified task.

14. The computer system of claim 11, further comprising:
for an identified task that was suspended, collecting and collating state information and control blocks for other identified tasks in a same component in which the identified task was running, and/or which were waiting on resources on which the identified task was waiting.

15. A computer program product comprising:
one or more computer-readable storage media and program instructions stored on the one or more computer-readable storage media, which when executed by a computer, cause the computer to perform a method comprising:
creating a system dump, including main memory and system state information;
storing the system dump to a database;
executing, by one or more processors, a program to provide tailored diagnostic information; and
creating, by one or more processors, a virtual memory image of a system state, based on the memory dump, in the address space of the program, by creating a second hardware memory mapping of the hardware memory addresses of the address space of the program to the virtual memory addresses of the virtual memory image of the system state.

16. The computer program product of claim 15, further comprising:
scanning the virtual memory image and system state information, using the second hardware memory mapping, to identify tasks that were running, tasks that have failed due to an error, and tasks that were suspended when the system dump was made;
collecting and collating based on task number, from the system dump, using the second hardware memory mapping, state information and control blocks associated with the identified tasks; and
storing, to the database, a formatted system dump, including the collected and collated state information and control blocks for the identified tasks.

17. The computer program product of claim 15, further comprising:
displaying, via a graphical user interface (GUI), the identified tasks; and
displaying, via the GUI, for each identified task, the state information and control blocks collected and collated for the task, whereby the state information and control blocks are associated with the task via hyperlinks.

18. The computer program product of claim 15, wherein state information and control blocks associated with the identified tasks are based on:
for each identified task that has failed due to an error, a component in which the task was running, resources associated with the task, a type of failure, and associated error information;
for each identified task that was running, a component in which the task was running and resources associated with the task; and
for each identified task that was suspended, a component in which the task was running and resources on which the task was waiting.

19. The computer program product of claim 18, further comprising:
for an identified task that has failed due to an error, collecting and collating state information and control blocks for other identified tasks in a same component in which the identified task was running when it failed, and/or to which resources were associated that were associated with the identified task.

20. The computer program product of claim 18, further comprising:
for an identified task that was running, collecting and collating, from the system dump, state information and control blocks for other identified tasks in a same component in which the identified task was running, and/or to which resources were associated that were associated with the identified task.

* * * * *